United States Patent [19]

Allenson et al.

[11] Patent Number: 4,792,406

[45] Date of Patent: Dec. 20, 1988

[54] METHOD FOR DEWATERING A SLURRY USING A TWIN BELT PRESS WITH CATIONIC AMINE SALTS

[75] Inventors: Stephan J. Allenson; Michael L. Braden, both of Richmond; Jack A. Banik, Sugar Land, all of Tex.

[73] Assignee: Nalco Chemical Company, Naperville, Ill.

[21] Appl. No.: 197,494

[22] Filed: May 23, 1988

[51] Int. Cl.$^4$ .................. C02F 11/14; B01D 37/06
[52] U.S. Cl. .................... 210/734; 210/738; 210/783; 210/609
[58] Field of Search ............... 210/609, 725, 727–736, 210/738, 778, 783, 770, 400, 401

[56] References Cited

U.S. PATENT DOCUMENTS

| | | | |
|---|---|---|---|
| 3,408,293 | 10/1968 | Dajani et al. | 210/53 |
| 3,531,404 | 9/1970 | Goodman et al. | 210/783 X |
| 3,578,586 | 5/1971 | Gal et al. | 210/725 X |
| 3,624,019 | 11/1971 | Anderson et al. | 260/29.6 H |
| 4,105,558 | 8/1978 | Heinrich et al. | 210/199 |
| 4,142,971 | 3/1979 | Le Fur et al. | 210/783 X |
| 4,330,450 | 5/1982 | Lipowski et al. | 210/732 X |
| 4,342,653 | 8/1982 | Halverson | 210/734 |
| 4,358,381 | 11/1982 | Takeuchi et al. | 210/727 |
| 4,383,927 | 5/1983 | Srivatsa | 210/732 X |
| 4,402,834 | 9/1983 | Bastgen | 210/783 X |
| 4,479,879 | 10/1984 | Hashimoto et al. | 210/727 |
| 4,569,768 | 2/1986 | McKinley | 210/727 |
| 4,587,023 | 5/1986 | Srivatsa et al. | 210/783 X |
| 4,707,272 | 11/1987 | Kistler | 210/783 X |

FOREIGN PATENT DOCUMENTS

| | | |
|---|---|---|
| 81110828.1 | 12/1981 | European Pat. Off. . |
| 49-10182 | 1/1974 | Japan . |
| 49-146371 | 12/1974 | Japan . |
| 50-136280 | 11/1975 | Japan . |
| 50-136279 | 11/1975 | Japan . |
| 50-148242 | 12/1975 | Japan . |
| 50-148241 | 12/1975 | Japan . |
| 52-122713 | 10/1977 | Japan . |
| 52-136445 | 11/1977 | Japan . |
| 53-28602 | 3/1978 | Japan . |
| 55-43556 | 4/1980 | Japan . |
| 56-18499 | 2/1981 | Japan . |
| 56-179031 | 11/1981 | Japan . |
| 57-69471 | 4/1982 | Japan . |
| 57-98698 | 6/1982 | Japan . |
| 57-185578 | 10/1982 | Japan . |
| 58-226535 | 11/1983 | Japan . |
| 58-236544 | 12/1983 | Japan . |
| 59-6852 | 1/1984 | Japan . |
| 59-197287 | 9/1984 | Japan . |
| 60-182997 | 8/1985 | Japan . |

OTHER PUBLICATIONS

M. Sugahara and S. Oku, "Sludge Conditioning in the Belt Filter Press", Gesuido Kyokaishi, (Osaka Ind. Univ.), 23(266), pp. 37–43.

Primary Examiner—Tom Wyse
Attorney, Agent, or Firm—John G. Premo; Paul D. Greeley; Anthony L. Cupoli

[57] ABSTRACT

A method for dewatering a slurry of solid particles suspended in a liquid using a twin belt press dewatering system, comprising the following steps:
 feeding the slurry of solid particles into the dewatering system;
 feeding a cationic amine salt solution into the dewatering system at a point just prior to the mixing drum, the cationic amine salt being a latex copolymer of acrylamide and dimethylaminoethylmethacrylate sulfuric acid salt having a mole ratio in the range between about 30:70 to 70:30, preferably 53:47;
 mixing the cationic amine salt solution with the slurry of solid particles in the mixing drum; and
 feeding the cationic amine salt solution/slurry mixture to the twin belt press, whereby the slurry of solid particles is dewatered. The cationic amine salt solution having a strength of less than 1% and a polymer concentration of about 35%.

18 Claims, 1 Drawing Sheet

METHOD FOR DEWATERING A SLURRY USING A TWIN BELT PRESS WITH CATIONIC AMINE SALTS

BACKGROUND OF THE INVENTION

The invention dramatically improves the dewatering capability of a twin belt press by the addition of a high molecular weight cationic amine salt to a slurry of solids to be dewatered. The addition of a high molecular weight cationic salt to a feed slurry dramatically improves the capture of solids in the gravity drainage filtrate with much lower solids in the belt wash water and results in a dryer cake at discharge.

Dewatering of slurries, such as waste activated sludge or aerobically digested sludge, is a process of liquid-solid separation wherein large quantities of liquid can be removed from a slurry by mechanical and chemical means. Dewatering does not, however, achieve 100% liquid-solids separation. Normally, moisture remains in a dewatered cake, and in many instances the filtrate contains solids from the slurry. Cake dryness and solids capture are typical indicators of the efficiency of a dewatering system, and are influenced by the mechanical device used, the chemical conditioning of the feed slurry and the characteristic of the slurry itself.

Water in refuse or process slurries may be present in one of three forms: free water, capillary water, or intracellular water. Free water drains easily from the solid particles, since no adhesive or capillary forces are to be overcome. Capillar water can be separated from solids by overcoming the adhesive and capillary forces holding the water amongst the solid particles. Capillary water is typically transformed to free water by increasing the particle size through the use of polymer flocculants. Intracellular water, water contained inside cell walls, can not be removed unlsss all the cell walls are lysed or broken. The breaking of cell walls requires high mechanical forces, heat and/or chemical treatment. Therefore, the content of intracellular water sets the theoretical upper limit for cake dryness in slurries where large amounts of the solids have a biological origin.

The twin belt press is one mechanical device which has been found to be particularly effective in dewatering slurries, such as waste activated sludge or aerobically digested sludge. Although the twin belt filter has been found to be most effective in removing free water from these slurries, it alone is not capable of overcoming the adhesive and capillary forces holding the capillary water in between the solids of the slurry. Due to the desirability of obtaining a much dryer cake at discharge, and reducing the solids permeating into the filtrate, attention has been given to various means for improving the capture of capillary water.

It is well settled that the use of polymer flocculants can assist in overcoming the adhesive and capillary forces holding water between the solids of a slurry, and thereafter transform such capillary water into free water which easily drains from the solid particles in a dewatering device, such as a twin belt press. The use of polymer flocculants in the dewatering of minerals, such as coal, phosphates, slimes, tar sands, mineral tailings, bentonite, and other clay products is demonstrated in the following patents: U.S. Pat. Nos. 3,408,293 (Dajani et al.), 3,578,586 (I. Gal et al.), 4,342,653 (Halverson), and 4,569,768 (McKinley); Japanese Patent Publication No. 49-10182; and European Patent Application No. 81110828.1 (Braun et al.). U.S. Pat. No. 3,408,293, U.S. Pat. No. 4,569,768, Japanese Patent Publication No. 49-10182, and European Patent Application No. 81110828.1 all demonstrate sequential adding of anionic polymers followed by cationic polymers to assist in the flocculation of mineral slurries prior to dewatering. The chemical addition of two polyelectrolytes is undesirable since it dramatically increases the cost of the dewatering process.

U.S. Pat. No. 4,342,653 describes the flocculation of aqueous suspensions of solids, such as phosphates, slimes, tar sands, coal refuse, etc., by addition of a polymeric anionic flocculant.

U.S. Pat. No. 3,578,586 proposes that it is preferable to treat slurries of coal or other minerals with a polyelectrolyte at various points throughout the dewatering system. The polelectrolytes having a molecular weight from 10,000 to 10,000,000 and added in at least two steps.

Ionic flocculants have also been added to slurries of sludge prior to dewatering with a mechanical device. The following patents all demonstrate the use of a two step approach using both anionic and cationic flocculating agents: U.S. Pat. Nos. 4,105,558 (Heinrich et al.), and 4,479,879 (Hashimoto et al.); and Japanese Patent Application Nos. 82/185578, 84/197287, 83/336544, 81/17903 and 81/18499. In particular, Japanese Patent Application No. 82/185578 adds polycations and amphoteric copolymers. Japanese Patent Application No. 83/236544 dewaters sludge by using inorganic coagulants and dewatering agents containing cationic organic polyeer coagulants, anionic organic polymer coagulants and acids. Japanese Patent Application No. 81/18499 mixes the sludge with a cationic polymer coagulant and a surfactant.

There are various patents which describe the use of cationic polymer flocculants to assist in the dewatering of sewage sludge. U.S. Pat. No. 3,531,404 proposes that sludge be mixed with a polyelectrolyte flocculant which has a high molecular weight and is cationic prior to dewatering the sludge. The following patents also disclose the use of a cationic polymer flocculants to assist in the dewatering of sludge: U.S. Pat. No. 4,358,381 (Takeuchi et al.), and Japanese Patent Application Nos. 84/6852,883/226535, 82/98698, 82/69471, 75/148242, 75/148241, 74/146371, 80/43556,778/28602, 75/136280, and 75/136279.

Japanese Patent Application No. 82/69471 demonstrates the use of a cationic polymer to assist in increasing the interlayer bond strength necessary for forming paper from pulp slurries. The cationic polymer being an acrylamide-dimethylaminoethylmethacrylate (DMAEM) sulfate copolymer. Japanese Patent Application No. 75/148242 discloses mixing a cationic amine salt having a 9:1 mole ratio and being a 30% aqueous solution with dimethylaminoethyl methacrylate methochloride polymer in a 86:14 ratio to provide a flocculant.

Japanese Patent Application No. 75/148241 prepares a cationic flocculant of acrylamide and DMAEM sulfate which are copolymered in a 9:1,8:2,7:3,5:5, or 3:7 mole ratio as a 20% aqueous solution. Japanese Patent Application No. 74/146371 also prepares a cationic flocculant by copolymering acrylaiide with a salt or quaternary derivative of DMAEM in aqueous acetone.

Although the aforementioned patents recognize that ionic flocculants may be used to assist in the dewatering of sludge, the present inventors have discovered that the particular cationic amine salt used in accordance with the process parameters of the present invention dramatically improves the capture of solids in the gravity drainage filtrate of a twin belt press with lower solids in the filtrate and a dryer cake at discharge. The cationic amine salt solution used in accordance with the process developed by the present inventors is much more cost effective than earlier flocculants, provides a cleaner filtrate requiring less recycle of total suspended solids therein, permits a wider polymer dosage, and allows for very fast floc formulation. Additional advantages of the present invention shall become apparent as described below.

SUMMARY OF THE INVENTION

It is the primary object of the present invention to improve the dewatering capability and the capture of sludge solids in the gravity drainage filtrate of a twin belt press, resulting in a much lower solids content in the belt wash water and a dryer cake at discharge. The method of the present invention provides for the dewatering of a slurry of solid particles suseended in a liquid, such as waste activated sludge or aerobically digested sludge, using a twin belt press dewatering system comprising the following steps:

(a) Feeding a slurry of solid particles into the dewatering system;

(b) Feeding a cationic amine salt solution into the dewatering system at a point just prior to either a mixin drum or an adjustable static mixer with a polymer injection ring, the cationic amine salt being a latex copolymer of acrylamide and dimethylaminoethylmethacrylate (DMAEM) sulfuric acid salt having a mole ratio in the range between about 30:70 to 70:30;

(c) Mixing the cationic amine salt solution with the slurry of solid particles in either a mixing drum or an adjustable static mixer wherein flocculation occurs; and (d) Feeding the cationic amine salt solution/slurry mixture to the twin belt press, whereby the slurry of solid particles is dewatered.

It is often preferable to concentrate the slurry of solid particles prior to dewatering by means of a thickener in order to have a slurry solution of between 1.5 to 2.5%. That is, the concentrated slrrry can be in a range between about 13,500 to 17,200 ppm. The slurry of solid particles can be fed to the dewatering system via a sludge pump at a feeding rate of between 50–120 gpm/meter of effective belt width.

The mole ratio of acrylamide to DMAEM sulfuric acid salt is preferably 53:47, wherein the percent polymer in the cationic amine salt solution is about 35%. The cationic amine salt solution is typically a concentration of 1%. However, it may be diluted by the addition of water to a range between about 0.25–1.0%, preferably diluted to a range between about 0.25–0.5%. One to five volumes of water is satisfactory for diluting the cationic amine salt solution to the desired concentration level. The cationic amine salt solution may be diluted in a static mixer or mixing "T". The cationic amine salt solution is thereafter fed into the dewatering system at a point at least 2 feet before the mixing drum. Some machines are equipped with a polymer injection ring followed by an adjustable static mixer instead of a mixing drum.

An additional object to the present invention is that the mixing of the cationic amine salt solution and the slurry of solid particles be conducted in a mixing drum or the like, at very slow speeds in the range between about 1 to 5 rpm. If the machine is equipped with a polymer injection ring and adjustable static mixer, then the mixer should be set at a minimum to low setting. Also, the twin belt press should be operated at slow speeds in the range between about 2 to 5 ft/min., whereby cake dryness is enhanced.

Additionally, the cationic amine salt has a molecular weight in the range between 2,000,000 to 30,000,000. The use of this cationic amine salt solution is particularly helpful in dewatering slurries, such as biological primary sludge, biological secondary sludge, waste activated sludge, and aerobic digested sludge.

The present invention may also include many additional features which shall be further described below.

DESCRIPTION OF THE PREFERRED EMBODIMENTS

Figure 1:
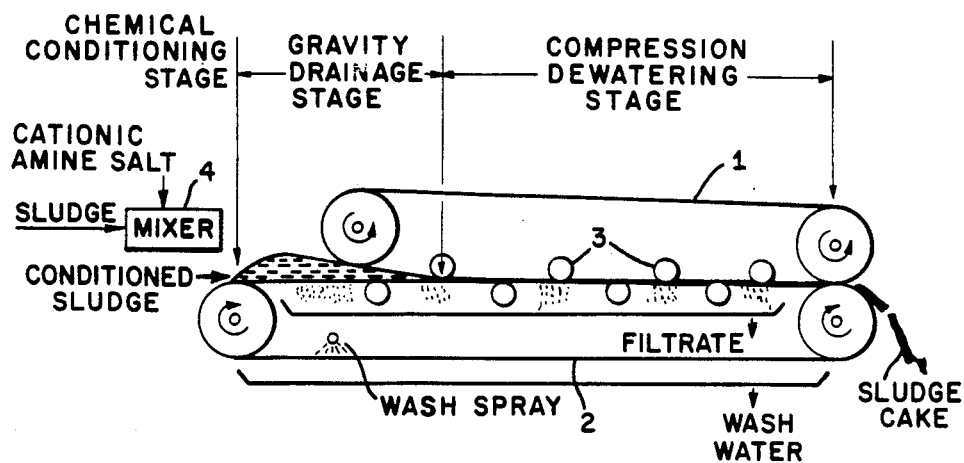
FIG. 1 is a schematic side view of a twin belt press used in accordance with the present invention.

The present invention provides a novel method for dewatering slurries of solid particles suspended in a liquid, such as waste activated sludge or aerobically digested sludge, by mean of a twin belt press using a high molecular weight cationic amine salt flocculant, whereby solids capture and cake dryness are marketably improved. This unique method includes the following steps: feeding of a slurry of solid particles into a twin belt press dewatering system; feeding a cationic amine salt solution into the dewatering system at a point just prior to a mixing drum, the cationic amine salt being a latex copolymer of acrylamide and DMAEM sulfuric acid salt having a mole ratio in the range between about 30:70 to 70:30, peeferably 53:47; mixing the cationic amine salt solution with the slurry of solid particles in the mixing drum where flocculation occurs; and feeding the cationic amine salt solution/slurry mixture to a twin belt press, whereby the slurry is dewatered resulting in a dryer cake and increased solids capture from the filtrate.

Belt filter presses employ single and/or double oppositely disposed moving belts to continuously dewater sludges through one or more phases of dewatering. The typical twin belt press includes the following three operational stages:

(1) chemical conditioning of the feed slurry, (2) gravity drainage to a non-fluid consistency, and (3) compaction of the dewatered sludge Good chemical conditioning is the key to successful and consistent performance of the belt filtered press, as it is for other dewatering processes. Chemical conditioning of sludge with 1% or less solution of a cationic amine salt, has been found to be particularly effective. The salt being a latex copolymer of acrylamide and DMAEM sulfuric acid salt having a mole ratio of 53:47, wherein the percent polymer in the salt is about 35%.

After chemical conditioning, the readily drainable water is separated from the slurry by discharge of the conditioned slurry onto a moving belt filter in a gravity drainage section of the dewatering system. Typically, less than one minute is required for drainage depending on the characteristics of the sludge and the effectiveness of the chemical conditioning. Following drainage, the sludge will have been reduced in volume by about 50% and will have a solids concentration of between 6-10%.

The formation of an even surface cake at this point is essential to successful operation of subsequent stages of the dewatering cycle, i.e., pressure and shear dewatering stages. The even surface prevents uneven belt tension and distortion while the relative rigidity of the mass of sludge allows further manipulation and allows for maximum speed through the twin belt press. The compression dewatering stage of the twin belt press begins as soon as the sludge is subjected to an increasing pressure, due either to the compression of the sludge between the carrying belt and cover belt or the application of a vacuum on the carrying belt. Pressures can be varied widely by alternate designs. During the compression dewatering stage, the sludge cake is squeezed between two belts and subjected to flexing in opposite directions (shearing) as it passes over the various rollers, causing increased water release and allowing greater compaction of the sludge. The advantage of the present invention is thtt preconditioning with the cationic amine salt solution permits additional free water to be filtered from the slurry resulting in a much dryer cake.

There are different designs of the double belt filter on tee market. Common to all is the use of a pair of endless or seamed belts (upper and lower), usually constructed of a polyester wire mesh, which merge together and enclose the cake there-between. The enclosed cake then passes through a series of roller arrangements before the belts part to discharge the dewatered cake. Before the merging of the belts, the bulk of the free water is separated from the solids by gravity drainage through one of the belts.

FIG. 1 demonstrates one example of a twin belt press. This mechanical device has an upper belt 1 and a lower belt 2 which are oppositely disposed. Rollers 3 are disposed on the inside of belts 1 and 2.

In the chemical conditioning stage the sludge feed is mixed with cationic amine salts in mixer 4. The conditioned sludge is thereafter fed to belt 2 where readily drainable water is separated by gravity from the sludge. During the gravity drainage stage the sludge volume is reduced by about 50%. Thereafter, the partially dewatered sludge enters the compression dewatering stage where belts 1 and 2 converge about the sludge, liquid is squeezed out through the belts, and a substantially dry cake is formed. During the compression dewatering stage the sludge volume is reduced geometrically by a series of roller arrangements 3. The liquid is driven out through both belts because of the forced reduction of volume, resulting in a pressure in the sludge cake that is higher than the surrounding aatmospheric pressure. The cake is thereafter discharged from the twin belt press for further downstream treatment.

Conditioning of the sludge with the particular cationic amine salt solution discovered by the present inventors results in greater solids capture and cake dryness. Conversion of capillary water into free water by flocculation of the solid particles in the sludge is enhanced by the conditioning of the sludge with the cationic amine salt solution of this invention.

Figure 2:
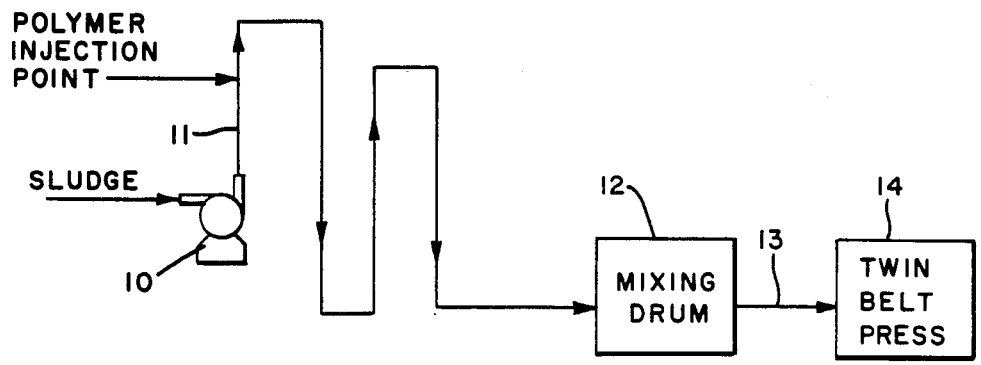
FIG. 2 is a flow diagram of the dewatering process in accordance with the prior art.

FIG. 2 is a flow diagram in accordance with the previously known twin belt press dewatering system. Referring to FIG. 2 sludge is introduced via sludge pump 10 into conduit 11 and a polymer solution is thereafter fed into conduit 11 to aid in the flocculation of the sludge. The polymer solution is normally injected into conduit 11 at a point very near the introduction of the sludge. This was for the purpose of allowing additional contact time between the polymer solution and the sludge since previously used polymers required more time for satisfactory flocculation. The treated sludge then traveled via conduit 11 to mixing drum 12 for further mixing of the sludge and polymer solution to enhance additional flocculation. Thereafter, the flocced sludge was fed via conduit 13 to a twin belt press 14 for dewatering of the sludge. Typical polymer solutions used in accordance with the flow sheet of FIG. 2 were latex copolymers of acrylamide and dimethylaminoethylmethacrylate methyl chloride quaternary with a mole ratio of 65:35, 55:45 and 45:55. The percent polymer in these polymer formulations typically being 35%. Another polymer solution used in accordance with FIG. 2 was Allied Chemical's C-310 which is quaternarized DMAEM latex emulsinn product.

Figure 3:
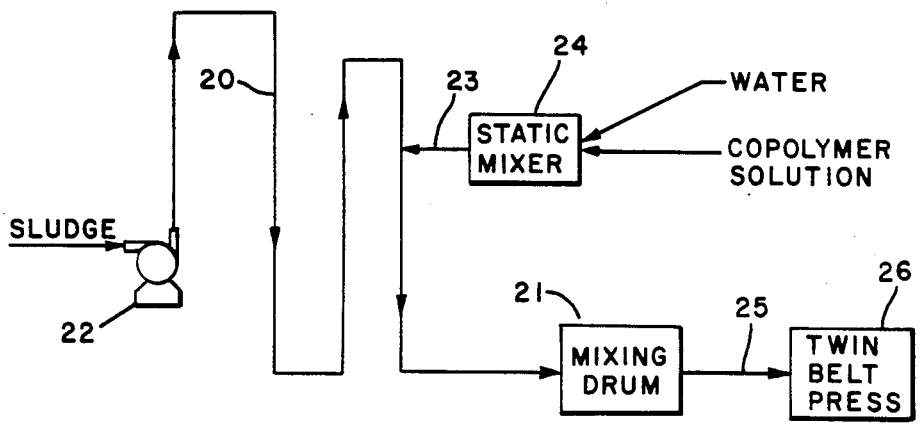
FIG. 3 is a flow diagram of the dewatering process in accordance with the present invention.

Referring to FIG. 3, the present inventors have discovered that the cationic amine salt solution of the present invention, not only results in producing a dryer cake, but also flocs extremely fast. Therefore, the flow sheet of a twin belt press dewatering system must be modified such that the fast floccing cationic amine salt solution is introduced along conduit 20 at a point just before mixing drum 21. Waste activated sludge, aerobically digested sludge, biological primary sludge, or biological secondary sludge may be introduced into the twin belt dewatering system of FIG. 3 via sludge pump 22; however, prior to introduction of the sludge it is preferable to concentrate the sludge in a thickener to about 1.5 to 2.5%, i.e., 13,500 to 17,200 ppm. Pump 22 feeds the sludge into the dewatering system via conduit 20 at a rate of between 50-120 gpm per meter of effective belt width. Just before the sludge feed enters mixing drum 21 the cationic amine salt solution is introduced into conduit 20 via conduit 23.

The cationic amine salt is a latex copolymer of acrylamide and dimethylaminoethylmethacrylate (DMAEM) sulfuric acid salt having a mole ratio in the range between about 30:70 to 70:30; preferably a mole ratio of 53:47. It has a molecular weight in the range between about 2,000,000 to 30,000,000. The percent of polymer in the cationic amine salt solution is typically about 35%. The copolymer is approximately a 1% solution which may be diluted prior to introduction into the dewatering system to about 0.25-1.0%; preferably 0.25-0.5%. The cationic amine salt solution may be diluted by mixing a 1% copolymer solution with water in static mixer or mixing "T38 24. The copolymer solution is diluted with water in an amount between 1-5 volumes.

The cationic amine salt solution enters the dewatering system via conduit 20 at a point at least 2 feet before mixing drum 21. It is fed into conduit 20 at a rate of between 2-3 gpm. Since the cationic amine salt solution flocs very rapidly its injection at or near mixing drum 21 is very important in order to avoid clogging of the system. The sludge and cationic amine salt solution then travel together via conduit 20 to mixing drum 21 where preconditioning or flocculating of the sludge results due to mixing at slow speeds, typically in the range between about 1 to 5 rpm. If the dewatering system is equipped with a polymer injection ring and adjustable static mixer, then the mixer should be set at a minimum to low setting. The cationic amine salt solution acts to floc the solid particles of the sludge, thereby overcoming any adhesive or capillary forces holding water between the particles and increasing the amount of free water.

The conditioned sludge is then fed via conduit 25 to twin belt press 26 for dewatering. In order to enhance dryness of the cake it is preferable that the twin belt press have a belt speed in the range between about 2 to 5 ft/min.

EXAMPLE

A biological waste activated sludge from a mixed liquor suspended solid was concentratdd in a thickener to about 1.5% to 2.5% prior to being fed to a twin belt press dewatering system. Thereafter, a Stranco Polyblend was used as the make-down device into a mixer equipped cationic polymer feed tank. A first batch of cationic amine salt solution was made up at about 1%. The next batch was made up at about 0.5% solution, and finally a post diluted batch of 0.25%. The cationic amine salt solution was a latex copolymer of acrylamide and DMAEM sulfuric acid salt with a mole ratio of 53:47. The percent polymer in the formulation was 35%. The molecular weight was in the range of 2,000,000 to 30,000,000.

Biological solids were fed into the dewatering system via a sludge pump at a rate of about 40 gpm and the total solid suspension range was from about 13,500 to 17,200 ppm. A 0.5% solution of cationic amine salt was introduced for preconditioning of the sludge feed, the polymer flow rate being between 2-3 gpm. The belt wash flow rate was 50 gpm. A 0.5% solution of cationic amine salt resuleed in a gravity drainage having 10 ppm, belt wash water having 150 ppm and solids captured calculated to 98.7%. In contrast, Allied Chemical's C-310 resulted in a gravity drainage of 50 ppm, belt wash water of 250 ppm and solids capture calculated to 97.6%. Thus, the cationic amine salt of the present invention improved the solids capture by approximately 1%.

Anionic polymer was injected prior to the cationic amine salt solution but did not improve either cake dryness or cationic usage.

Minimum conditioning of the sludge feed with the cationic amine salt solution was desirable as the floc formed quickly, and was subject to shear degredation with more mixing of the two elements. Thus, the best injection point was found to be just before the rotary mixing drum on the twin belt press dewatering system. It was also discovered that the slower the speed of the belt of the twin belt press, the better the cake dryness. The slippage at various slow belt speeds (a machine function of this earlier model A/A twin belt press drive) prevented a full investigation. This slippage was the result of a thick cake leaving the wedge zone and entering the high pressure section. The process according to the present invention operated better when the mixing drum speed was slower. It is important, however, that some minimum rpm be maintained in the mixing drum as inadequate polymer conditioning was regularly noted when the mixing drum was turned completely off.

The cationic amine salt solution prepared above was injected approximately two feet upstream of the mixing drum. Conditioning of the waste activated sludge resulted in a dramatic reduction in gravity drainage solids and belt water solids recycle. Furthermore, condtioning with the cationic amine salt solution as prepared above resulted in an estimated 1% increase in cake dryness over Allied Chemical's C-310 quaternary DMAEM solution and approximately a 10% increase over anionic flocculants. It was also discovered that this cationic amine salt solution was very responsive to both primary and secondary sludges, thus having a wide operating window.

Table 1 below sets forth the disposal cost of cake from a twin belt press. It is based on a feed rate of 40 gpm of 1.5% consistency sludge and a 98.7% recovery.

TABLE 1

(DISPOSAL COST OF CAKE)

| Cake Solids | Water in Cake | | Disposal Cost @ $0.05/Lb. | | |
|---|---|---|---|---|---|
| | Lbs/hr | A H$_2$O/hr | Solids | Water | Total |
| 12 | 2169 | — | $14.80 | $108.45 | $123.25 |
| 13 | 1979 | 190 | $14.80 | Change = | $9.50 |
| 14 | 1817 | 162 | $14.80 | Change = | $8.10 |
| 15 | 1676 | 141 | $14.80 | Change = | $7.05 |
| 16 | 1553 | 123 | $14.80 | Change = | $6.15 |
| 17 | 1444 | 109 | $14.80 | Change = | $5.45 |

Polymer Lbs/hr at 30 Lbs/ton = 4.4 Lbs.
Polymer Lbs/hr at 40 Lbs/ton = 5.9 Lbs.
Polymer Lbs/hr at 50 Lbs/ton = 7.4 Lbs.

As is apparent from Table 1 above, a 1% improvement in cake solids capture results in a savings equal to or exceeding the cost of the polymers used in flocculating the feed. This results in extremely dramatic improvement in the operational process of the twin belt press dewatering system. Using the process and cationic amine salt solution of the present invention increases the solids capture of a dewatered sludge by at least 1%. No anionic polymer flocculant is required, thus reducing the cost associated with any of the prior art processes using both cationic and anionic solutions. Moreover, the process of the present invention resulted in dramatically improving the capture of solids in the gravity drainage filtrate with a much lower solids content in the belt wash water. This reduces potential problems associated with particle recycling and improves capture of the fines in the cake discharge.

The slow belt speed of the twin belt press promoted the cake dryness and the dilution of the polymer to a 0.5% solution established the best flocculation at the lowest cost/time of dry solids and still resulted in enhancing cake dryness.

While we have shown and described several embodiments in accordance with our invention, it is to be clearly understood that the same are susceptible to numerous changes and modifications apparent to one skilled in the art. Therefore, we do not wish to be limited to the details shown and described but intend to show all changes and modifications which come within the scope of the appended claims.

What is claimed is:

1. A method for dewatering a slurry of solid particles suspended in a liquid using a twin belt press dewatering system, which includes a mixing drum and twin belt press, comprising the following steps:
   feeding said slurry of solid particles into said dewatering system;
   feeding a cationic amine salt solution into said dewatering system at a point just prior to said mixing drum, said cationic amine salt being a latex copolymer of acrylamide and dimethylaminoethylmethacrylate sulfuric acid salt having a mole ratio in the range between about 30:70 to 70:30;

mixing said cationic amine salt solution with said slurry of solid particles in said mixing drum; and feeding the cationic amine salt solution/slurry mixture to said twin belt press, whereby said slurry of solid particles is dewatered.

2. The method according to claim 1, wherein said slurry of solid particles is first concentrated in a thickener to a solution in the range between about 1.5 to 2.5%.

3. The method according to claim 2, wherein said concentrated slurry is in the range between about 13,500 to 17,200 ppm.

4. The method according to claim 1, wherein said slurry of solid particles is fed to said dewatering system via a pump.

5. The method according to claim 4, wherein said slurry of solid particles is fed to said dewatering system at a rate of between 50 to 120 gpm per meter of effective belt width.

6. The method according to claim 1, wherein the mole ratio of acrylamide to dimethylaminoethylmethacrylate sulfuric acid salt is 53:47.

7. The method according to claim 1, wherein the percent polymer in said cationic amine salt solution is about 35%.

8. The method according to claim 1, wherein said cationic amine salt solution is about 1%.

9. The method according to claim 1, wherein said cationic amine salt solution is diluted to a range between about 0.25–1.0%.

10. The method according to claim 9, wherein said cationic amine salt solution is diluted to a range between about 0.25–0.5%.

11. The method according to claim 9, wherein said cationic amine salt solution is diluted with water in an amount between 1 to 5 volumes.

12. The method according to claim 1, wherein said cationic amine salt solution is fed into said dewatering system at a point at least 2 feet before said mixing drum.

13. The method according to claim 1, wherein the mixing of said cationic amine salt solution and said slurry of solid particles in said mixing drum is conducted at speeds in the range between about 1 to 5 rpm.

14. The method according to claim 1, wherein said twin belt press has a belt speed in the range between 2 to 5 ft/min.

15. The method according to claim 1, wherein said cationic amine salt has a molecular weight in the range between about 2,000,000 to 30,000,000.

16. The method according to claim 1, wherein said slurry of solid particles suspended in a liquid is at least one selected from the group consisting of biological primary sludge, biological secondary sludge, waste activated sludge, and aerobically digested sludge.

17. The method according to claim 1, wherein said cationic amine salt solution is fed to said dewatering system at a rate between 2–3 gpm.

18. The method according to claim 1, wherein the mixing of said cationic amine salt solution and said slurry of solid particles takes place in an adjustable static mixer and/or polymer injection ring instead of mixing drum, wherein the mixing occurs at minimum to low speeds.

* * * * *